US012494568B2

(12) United States Patent
Yoon et al.

(10) Patent No.: US 12,494,568 B2
(45) Date of Patent: Dec. 9, 2025

(54) ANTENNA STRUCTURE

(71) Applicant: DONGWOO FINE-CHEM CO., LTD., Jeollabuk-do (KR)

(72) Inventors: Ho Dong Yoon, Gyeonggi-do (KR); Hee Jun Park, Gyeonggi-do (KR); Young Su Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 141 days.

(21) Appl. No.: 18/382,686

(22) Filed: Oct. 23, 2023

(65) Prior Publication Data

US 2024/0154299 A1 May 9, 2024

(30) Foreign Application Priority Data

Nov. 8, 2022 (KR) ........................ 10-2022-0148172

(51) Int. Cl.
*H01Q 1/38* (2006.01)
*H01Q 1/48* (2006.01)

(52) U.S. Cl.
CPC ................. *H01Q 1/38* (2013.01); *H01Q 1/48* (2013.01)

(58) Field of Classification Search
CPC ........... H01L 23/48; H01L 23/58; H01Q 9/42; H01Q 1/02; H01Q 1/22; H01Q 1/24; H01Q 1/38; H01Q 1/36; H01Q 1/243; H01Q 1/2208; H01Q 5/00; H01Q 5/10; H01Q 5/371; H01Q 5/50; H04M 1/02; H04M 1/026
See application file for complete search history.

(56) References Cited

U.S. PATENT DOCUMENTS

2008/0272977 A1* 11/2008 Gaucher ................ H01Q 23/00
343/860

FOREIGN PATENT DOCUMENTS

KR 10-2009-0076839 A 7/2009
KR 10-2019-0009232 A 1/2019
WO WO-2020153645 A1 * 7/2020 ............... H01Q 1/38

* cited by examiner

*Primary Examiner* — Henry Luong
(74) *Attorney, Agent, or Firm* — The PL Law Group, PLLC

(57) ABSTRACT

An antenna structure includes an antenna unit including a signal pad and a ground pad spaced apart from the signal pad, and a circuit board electrically connected to the antenna unit. The circuit board includes a connection pad connected to the signal pad and a bonding pad connected to the ground pad. The bonding pad has an area smaller than an area of the ground pad. The antenna structure is connected to an external circuit through the circuit board to provide a multi-band radiation.

20 Claims, 7 Drawing Sheets

ANTENNA STRUCTURE

CROSS-REFERENCE TO RELATED APPLICATION AND CLAIM OF PRIORITY

This application claims the benefit under 35 USC § 119 of Korean Patent Application No. 10-2022-0148172 filed on Nov. 8, 2022 in the Korean Intellectual Property Office (KIPO), the entire disclosure of which is incorporated by reference for all purposes.

BACKGROUND

1. Field

The present invention relates to an antenna device. More particularly, the present invention relates to an antenna structure including an antenna unit capable of radiating in a plurality of frequency bands.

2. Description of the Related Art

As information technologies have been developed, a wireless communication technology such as Wi-Fi, Bluetooth, etc., is combined or embedded in an image display device, an electronic device, an architecture, etc.

As mobile communication technologies have been rapidly developed, an antenna capable of operating a high frequency or ultra-high frequency communication is being applied to public transportations such as a bus and a subway, a building structure, and various mobile devices.

Accordingly, implementation of radiation properties in a plurality of frequency bands from a single antenna device may be needed. In this case, a high frequency antenna and a low frequency antenna may be included in a single device.

However, if antennas of different frequency bands are disposed to be adjacent to each other, radiation and impedance properties of the different antennas may collide with each other, and signaling in multiple direction may not be implemented.

Further, when antennas of different frequency bands are disposed to be separated from each other, a space for the antenna increases, which may degrade spatial efficiency and aesthetic properties of a structure to which the antenna device is applied.

For example, Korean Published Patent Application No. 2019-0009232 discloses an antenna module integrated into a display panel. However, a broadband antenna with improved radiation reliability is not disclosed.

SUMMARY

According to an aspect of the present invention, there is provided an antenna device having improved radiation property and radiation reliability.

(1) An antenna structure, including: an antenna unit including a signal pad and a ground pad spaced apart from the signal pad; and a circuit board electrically connected to the antenna unit, the circuit board including a connection pad connected to the signal pad and a bonding pad connected to the ground pad, the bonding pad having an area smaller than an area of the ground pad.

(2) The antenna structure of the above (1), wherein the area of the bonding pad is 50% or more, and less than 100% of the area of the ground pad.

(3) The antenna structure of the above (1), wherein a length of the bonding pad and a length of the ground pad are the same, and a width of the bonding pad is smaller than a width of the ground pad.

(4) The antenna structure of the above (1), wherein an area of the signal pad and an area of the connection pad are the same.

(5) The antenna structure of the above (1), wherein a gap between the signal pad and the ground pad is smaller than a gap between the connection pad and the bonding pad.

(6) The antenna structure of the above (1), wherein a pair of the ground pads are disposed to face each other with the signal pad interposed therebetween, and a pair of the bonding pads are disposed to face each other with the connection pad interposed therebetween.

(7) The antenna structure of the above (6), wherein a left side of the ground pad adjacent to a left side of the signal pad and a left side of the bonding pad adjacent to a left side of the connection pad overlap each other in a plan view, and a right side of the ground pad adjacent to a right side of the signal pad and a right side of the bonding pad adjacent to a right side of the connection pad overlap each other in the plan view.

(8) The antenna structure of the above (1), wherein the antenna unit further includes a radiator including a plurality of radiation portions, widths of which sequentially decrease, a transmission line extending between the radiator and the signal pad; and a pair of a ground pattern disposed around the transmission line to be physically spaced apart from the radiator and the transmission line.

(9) The antenna structure of the above (8), wherein the ground pad protrudes from a bottom side of the ground pattern.

(10) The antenna structure of the above (8), wherein the plurality of radiation portions include a first radiation portion, a second radiation portion and a third radiation portion, widths of which sequentially decrease.

(11) The antenna structure of the above (10), wherein the first radiation portion, the second radiation portion and the third radiation portion are arranged in a stepped shape.

(12) The antenna structure of the above (10), wherein an average resonance frequency of the second radiation portion is greater than an average resonance frequency of the first radiation portion, and an average resonance frequency of the third radiation portion is greater than the average resonance frequency of the second radiation portion.

(13) The antenna structure of the above (10), wherein the ground pattern serves as a fourth radiation portion.

(14) The antenna structure of the above (13), wherein an average resonance frequency of the fourth radiation portion is greater than an average resonance frequency of the third radiation portion.

(15) The antenna structure of the above (8), wherein the transmission line includes an extension portion directly connected to the radiator at one end of the transmission line; and an inclined portion disposed between the extension portion and the signal pad, the inclined portion having a width that becomes smaller in a direction from the extension portion to the signal pad.

(16) The antenna structure of the above (15), wherein the transmission line further includes a connector being disposed between the inclined portion and the signal pad and having a constant width.

(17) The antenna structure of the above (8), wherein the ground pattern includes: a first portion having a constant width; a third portion that is spaced apart from the first portion and has a larger constant width than that of the first portion; and a second portion between the first portion and the third portion, the second portion having a width that increases in a direction from the first portion to the third portion.

(18) The antenna structure of the above (17), wherein a distance between the second portion and the transmission line decreases in a direction from the first portion to the third portion.

(19) The antenna structure of the above (8), wherein the radiator has a mesh structure.

(20) The antenna structure of the above (19), further including a dummy mesh pattern disposed around the radiator and spaced apart from the radiator.

According to example embodiments, an antenna unit included in an antenna structure may include a plurality of radiating portions, widths of which sequentially decrease. Accordingly, a multi-band antenna in which a multi-band signal transmission/reception is performed may be implemented in a single radiator The antenna unit may include a signal pad and a ground pad, and a circuit board may include a connection pad bonded to the signal pad and a bonding pad bonded to the ground pad. An area of the bonding pad may be smaller than an area of the ground pad. An impedance of the antenna structure may be easily adjusted to a range suitable for a desired frequency by the bonding pad. Accordingly, transmission and reception properties of the antenna structure for a multi-band may be improved.

The antenna unit may include a ground pattern that is physically separated from a radiator and includes a tapered lateral side toward the transmission line. The ground pattern may serve as an auxiliary radiator. For example, the ground pattern may add a high-frequency band radiation to the antenna unit through a coupling with the radiator and/or the transmission line.

DETAILED DESCRIPTION OF THE EMBODIMENTS

According to exemplary embodiments of the present invention, an antenna device providing a radiation of a plurality of resonance frequency bands from a single antenna unit is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "first," "second," "upper," "lower," "top," "bottom," "right," "left," etc., herein are used to relatively distinguish positions of components, and are not intended to designate absolute positions.

Figure 1:
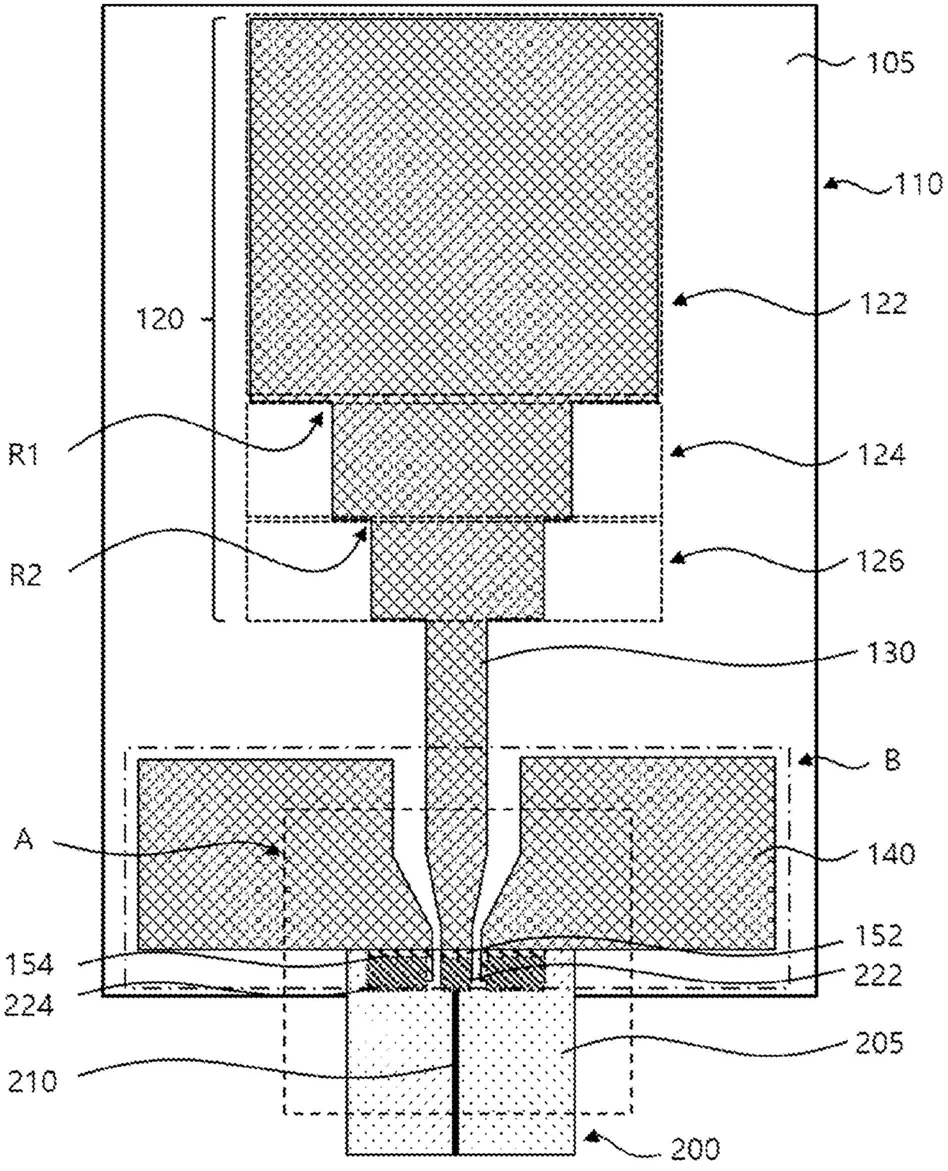
FIGS. 1 and 2 are a schematic plan view and a schematic cross-sectional view, respectively, illustrating an antenna structure in accordance with exemplary embodiments.

FIG. 1 is a schematic plan view illustrating an antenna structure in accordance with exemplary embodiments.

Referring to FIG. 1, the antenna structure may include an antenna unit 110 and a circuit board 200 connected to the antenna unit 110. The antenna unit 110 may be formed on a dielectric layer 105.

The dielectric layer 105 may include, e.g., a transparent resin material. For example, the dielectric layer 105 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbornene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination thereof.

An adhesive film such as an optically clear adhesive (OCA), an optically clear resin (OCR), etc., may be included in the dielectric layer 105.

In an embodiment, the dielectric layer 105 may include an inorganic insulating material such as glass, silicon oxide, silicon nitride, silicon oxynitride, etc.

In an embodiment, the dielectric layer 105 may be provided as a substantially single layer.

In an embodiment, the dielectric layer 105 may have a multi-layered structure of at least two layers. For example, the dielectric layer 100 may include a substrate layer and an antenna dielectric layer, and may include an adhesive layer between the substrate layer and the antenna dielectric layer.

An Impedance or an inductance for the antenna unit 110 may be generated by the dielectric layer 105, so that a frequency band at which the antenna structure may be driven or operated may be adjusted. In some embodiments, a dielectric constant of the dielectric layer 105 may be adjusted in a range from about 1.5 to about 12. When the dielectric constant exceeds about 12, a driving frequency may be excessively decreased, so that driving in a desired high frequency band may not be implemented.

The antenna unit 110 may include a radiator 120 and a transmission line 130 electrically connected to the radiator 120. In example embodiments, the antenna unit 110 may be disposed around the transmission line 130 and may include a ground pattern 140 that may be physically spaced apart from the radiator 120 and the transmission line 130.

The antenna unit 110 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the antenna unit 110 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the antenna unit 110 may include a transparent conductive oxide such indium tin oxide (ITO), indium zinc oxide (IZO), zinc oxide (ZnOx), indium zinc tin oxide (IZTO), etc.

In some embodiments, the antenna unit 110 may include a stacked structure of a transparent conductive oxide layer and a metal layer. For example, the antenna unit 110 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 110 may include a blackened portion, so that a reflectance at a surface of the antenna unit 110 may be decreased to suppress a visual recognition of the antenna unit due to a light reflectance.

In an embodiment, a surface of the metal layer included in the antenna unit 110 may be converted into a metal oxide or a metal sulfide to form a blackened layer. In an embodiment, a blackened layer such as a black material coating layer or a plating layer may be formed on the antenna unit 110 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

In example embodiments, the radiator 120 may include a plurality of radiation portions, widths of which sequentially decrease. Accordingly, a multi-band antenna that may transmit and receive signals in multiple bands may be implemented from a single radiator.

The term "width" used herein may refer to a horizontal length of the radiator 120, transmission line 130 or the ground pattern 140 in FIGS. 1 and FIGS. 3 to 6.

In some embodiments, the plurality of radiation portions may include a first radiation portion 122, a second radiation portion 124 and a third radiation portion 126, widths of which sequentially decrease. In the plan view, the third radiation portion 126, the second radiation portion 124 and the first radiation portion 122 may be sequentially arranged from the transmission line 130.

The first radiation portion 122 may correspond to an uppermost or outermost portion in a length direction of the antenna unit 110 from the transmission line 130 in the plan view.

The first radiation portion 122 may serve as a low-frequency radiator of the radiator 120 or the antenna unit 110. For example, a radiation in the lowest frequency band obtained by the antenna unit 110 may be implemented from the first radiation portion 122. For example, a resonance frequency of the first radiation portion 122 may be in a range from about 0.1 GHz to 1.4 GHz.

In an embodiment, a radiation band corresponding to an LTE1 band may be obtained from the first radiation portion 122. In an embodiment, the resonance frequency from the first radiating unit 122 may be in a range from 0.5 GHz to 1 GHz, or from 0.6 GHz to 1 GHz.

The second radiation portion 124 may serve as a first mid-band radiator of the radiator 120 or the antenna unit 110. For example, an average resonance frequency of the second radiation portion 124 may be greater than an average resonance frequency of the first radiation portion 122. For example, a resonance frequency of the second radiation portion 124 may be in a range from about 1.5 GHz to 2.5 GHz.

In an embodiment, a radiation band corresponding to an LTE2 band may be obtained from the second radiation portion 124. For example, the resonance frequency of the second radiation portion 124 may be in a range from 1.7 GHz to 2.0 GHz.

In some embodiments, the second radiation portion 124 may have a smaller width than that of the first radiation portion 122.

In some embodiments, a first recess R1 may be formed at a boundary between the first radiation portion 122 and the second radiation portion 124. A recess-shaped boundary portion may be formed, so that independent radiation properties between the first radiation portion 122 and the second radiation portion 124 may be improved. For example, the above-described low-frequency band radiation from the first radiation portion 122 may be prevented from disturbing the first mid-band radiation from the second radiation portion 124.

The third radiation portion 126 may serve as the second mid-band radiator of the radiator 120 or the antenna unit 110. A resonance frequency range of the third radiation portion 126 may be higher than that of the second radiation portion 124. For example, a resonance frequency of the third radiation portion 126 may be in a range from about 2.0 GHz to 3.0 GHz.

In an embodiment, a radiation band corresponding to an LTE2 band/2.4 GHz Wi-Fi band may be obtained from the third radiation portion 126. For example, the resonance frequency of the third radiation portion 126 may be in a range from about 2.2 GHz to 2.7 GHz.

In an embodiment, the resonance frequency range of the third radiation portion 126 may overlap the resonance frequency range of the second radiation portion 124.

In some embodiments, the third radiation portion 126 may have a smaller width than that of each of the first radiation portion 122 and the second radiation portion 124.

In some embodiments, a second recess R2 may be formed at a boundary between the second radiation portion 124 and the third radiation portion 126. Radiation independence and reliability through the third radiation portion 126 may be improved by the second recess R2.

In some embodiments, the transmission line 130 may be directly connected to the third radiation portion 126. For example, the transmission line 130 may transmit a driving signal or a power from a driving integrated circuit (IC) chip to the radiator 120.

For example, one end portion of the transmission line 130 may be directly, physically and electrically connected to the third radiation portion 126 to transmit the signal and power to the radiator 120. The other end portion of the transmission line 130 may be electrically connected to the driving IC chip through an antenna cable. Accordingly, signal transmission/ reception and feeding from the driving IC chip to the radiator 120 may be performed.

In some embodiments, the first radiation portion 122, the second radiation portion 124 and the third radiation portion 126 may be arranged in a stepped shape. Accordingly, independence of the driving frequency band of each radiation portion may be improved.

In some embodiments, each lateral side of the radiation portions 122, 124 and 126 may have a straight line shape. For example, each of the first radiation portion 122, the second radiation portion 124 and the third radiation portion 126 may have a rectangular shape. Accordingly, signal transmission between the radiation portions may be implemented while suppressing an impedance variation. Additionally, the frequency band may be easily adjusted in a desirable range.

In an embodiment, all lateral sides of the radiator 120 may have a straight line shape.

In some embodiments, the lateral sides of the radiation portions 122, 124 and 126 may have a straight line shape parallel to the transmission line 130. Accordingly, a distance of signal transmission/reception distance may be reduced to increase signal efficiency.

In some embodiments, the lengths of the first radiation portion 122, the second radiation portion 124 and the third radiation portion 126 may be different from each other. Accordingly, the driving frequency band of each radiation portion may be adjusted/changed in a desirable range.

In some embodiments, the lengths of the first radiation portion 122, the second radiation portion 124 and the third radiation portion 126 may sequentially decrease. In this case, a difference between the driving frequency bands of the radiation portions may be increased. For example, a band between the driving frequency range of the first radiation portion 122 and the driving frequency range of the second radiation portion 124 may become wide, and a band between the driving frequency range of the second radiation portion 124 and the driving frequency range of the third radiation portion 126 may become wide. Accordingly, interference and disturbance between the driving frequency ranges may be prevented, and resolution in each driving frequency range may be improved.

The term "length" used herein may refer to a vertical length perpendicular to the horizontal direction of the radiator 120, the transmission line 130 or the ground pattern 140 in FIGS. 1 and FIGS. 3 to 6.

In example embodiments, the ground pattern 140 may be disposed around the transmission line 130 and spaced apart from the radiator 120 and the transmission line 130. For example, a pair of the ground patterns 140 may be arranged to face each other with the transmission line 130 interposed therebetween.

In some embodiments, a first portion 142 and a second portion 144, which will be described later, of the ground pattern 140 may serve as auxiliary radiators (see FIG. 5). For example, the first portion 142 and the second portion 144 of the ground pattern 140 may serve as a fourth radiation portion by an electrical coupling with the radiator 120 and/or the transmission line 130.

For example, the fourth radiation portion may serve as a high-frequency radiation region of the antenna unit 110. A radiation of the highest frequency band obtained by the antenna unit 110 may be implemented from the fourth radiation portion. For example, a resonance frequency of the fourth radiation portion may be in a range from about 3.0 GHz to 6.0 GHz.

In one embodiment, a radiation band corresponding to Sub-6 5G may be obtained from the fourth radiation portion. In an embodiment, the resonance frequency of the fourth radiation portion may be in a range from about 3 GHz to 4 GHz, or from about 3.1 GHz to 3.8 GHz.

An average resonance frequency of the fourth radiation portion may be greater than that of the third radiation portion 126.

The driving frequency bands of the first radiation portion 122, the second radiation portion 124, the third radiation portion 126 and the fourth radiation portion described above are exemplary and may be properly changed in desirable ranges.

For example, a size/area of the radiator 120 may be adjusted according to the target frequency band. For example, the driving frequency band may be shifted to a high frequency band by reducing an overall area of the radiator 120. In this case, the first radiation portion 122 may be operated in the radiation band of the above-described second radiation portion 124, and the second radiation portion 124 may be operated in the radiation band of the third radiation portion 126 described above. Additionally, the third radiation portion 126 may be operated in the radiation band of the above-described fourth radiation portion 128, and the fourth radiation portion 128 may be operated in a high frequency band exceeding the radiation band of the above-described fourth radiation portion 128.

A plurality of the radiation portions having different resonance frequency ranges may be included in one antenna unit 110, so that, e.g., a multi-band antenna may be implemented while improving spatial efficiency.

In some embodiments, a plurality of the radiators 120 may be arranged on the dielectric layer 105 to form a radiator column and/or a radiator row.

In an embodiment, two radiators 120 may be arranged on the dielectric layer 105 to be spaced apart in a width direction of the dielectric layer 105.

According to the above-described exemplary embodiments, radiation properties of at least three frequency bands may be implemented from the antenna unit 110.

In example embodiments, the lengths of the first radiation portion 122, the second radiation portion 124 and/or the third radiation portion 126 may be properly changed/adjusted according to target driving frequencies. As described above, an average resonance frequency of the first radiation portion 122 may be smaller than that of the second radiation portion 124, and the average resonance frequency of the second radiation portion 124 may be smaller than that of the third radiation portion 126.

In some embodiments, the length of the second radiation portion 124 may be greater than each length of the first radiation portion 122 and the third radiation portion 126. In this case, the resonance frequency range of the second radiation portion 124 may be shifted to a lower region.

In some embodiments, the length of the third radiation portion 126 may be greater than each length of the first radiation portion 122 and the second radiation portion 124. In this case, the resonance frequency range of the third radiation portion 126 may be shifted to a lower region.

An end portion of the transmission line 130 may be electrically connected to a signal pad 152. The signal pad 152 may be connected to an external circuit (e.g., a circuit board). For example, the transmission line 130 may extend between the radiator 120 and the signal pad 152 to electrically connect the radiator 120 and the external circuit.

The antenna unit 110 may include a ground pad 154 spaced apart from the signal pad 152. For example, a pair of the ground pads 154 may be disposed to face each other with the signal pad 152 interposed therebetween. Accordingly, noises generated during the signal transmission and reception through the signal pad 152 may be efficiently filtered or reduced.

In some embodiments, the ground pad 154 may protrude from a bottom side of the ground pattern 140. For example, the ground pad 154 may be integral with the ground pattern 140.

Figure 2:
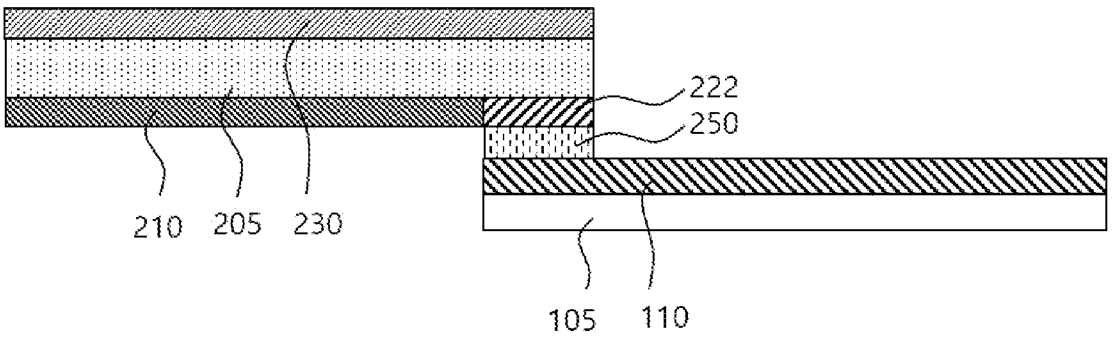

FIG. 2 is a schematic cross-sectional view, respectively, illustrating an antenna structure in accordance with exemplary embodiments. For convenience of descriptions, detailed elements/structure of the antenna unit 110 is omitted in FIG. 2.

Referring to FIGS. 1 and 2, the circuit board 200 may be disposed on the antenna unit 110 and may be electrically connected to the antenna unit 110. In an embodiment, the circuit board 200 may be a printed circuit board (PCB) including a rigid board or a flexible printed circuit board (FPCB).

The circuit board 200 may include a core layer 205 and a circuit wiring 210 disposed on one surface of the core layer 205. In an embodiment, the circuit board 200 may further include a ground layer 230 disposed on the other surface of the core layer 205.

The core layer 205 may include a flexible resin such as a polyimide resin, modified polyimide (MPI), an epoxy resin, polyester, a cycloolefin polymer (COP), a liquid crystal polymer (LCP), etc.

The circuit wiring 210 may serve as an antenna feeding wiring. For example, one end portion of the circuit wiring 210 may be electrically connected to the antenna unit 110, and the other end portion of the circuit wiring 210 may be electrically connected to a driving IC chip.

In some embodiments, the circuit wiring 210 and the ground layer 230 may be formed of the above-described metal or alloy, and may include a transparent metal oxide. In an embodiment, the circuit wiring 210 and the ground layer 230 may include a stacked structure of the transparent conductive oxide layer and the metal layer.

The one end portion of the circuit wiring 210 may be electrically connected to a connection pad 222. The connection pad 222 may be attached or bonded to the signal pad 152 of the antenna unit 110. The connection pad 222 may be arranged to overlap the signal pad 152 of the antenna unit 110 in the plan view.

In an embodiment, the connection pad 222 may be bonded to the signal pad 152 included in the antenna unit 110 through a conductive intermediate structure 250.

For example, in a region where the antenna unit 110 and the circuit board 200 are bonded, the signal pad 152, the conductive intermediate structure 250 and the connection pad 222 may be sequentially contacted or stacked.

In an embodiment, the conductive intermediate structure 250 may include an anisotropic conductive film (ACF).

For example, the conductive intermediate structure 250 such as an anisotropic conductive film (ACF) may be attached on the signal pad 152 and/or the ground pad 154, and then a bonding region of the circuit board 200 may be disposed on the conductive intermediate structure 250. The circuit board 200 may be connected to the antenna unit 110 through a heat treatment/pressurization process.

The circuit board 200 may include a bonding pad 224 spaced apart from the connection pad 222. For example, a pair of the bonding pads 224 may be arranged to face each other with the connection pad 222 interposed therebetween.

The bonding pad 224 may be arranged to overlap the ground pad 154 of the antenna unit 110 in the plan view. For example, the bonding pad 224 may be bonded to the ground pad 154 via the conductive intermediate structure 250.

The bonding pad 224 may be disposed around the connection pad 222, so that bonding stability between the circuit board 200 and the antenna unit 110 may be further improved. Additionally, stress caused by the bonding of the signal pad 152 and the connection pad 222 may be relieved or dispersed, thereby preventing cracks due to the bonding.

Figure 3:
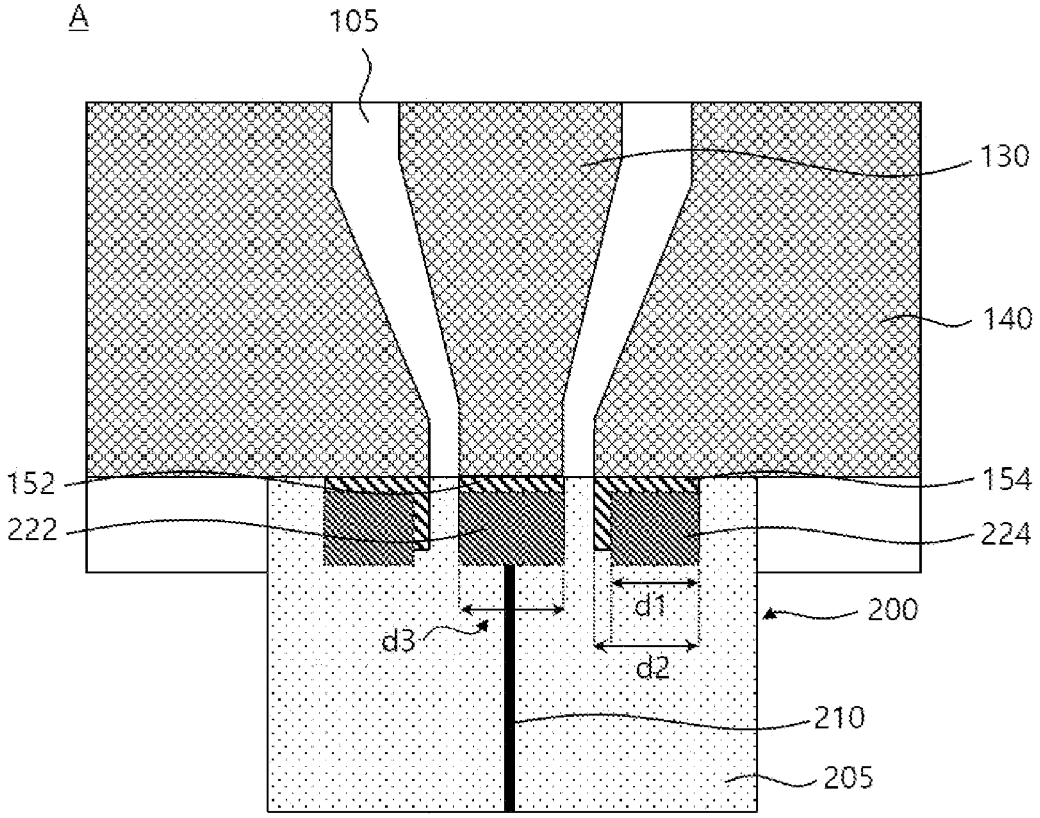
FIG. 3 is an enlarged plan view of a region A of FIG. 1.

FIG. 3 is an enlarged plan view of a region A of FIG. 1.

Referring to FIG. 3, the signal pad 152 and the connection pad 222 may be arranged to overlap in the plan view, and the ground pad 154 and the bonding pad 224 may be arranged to overlap in the plan view.

In FIGS. 1 and 3, the signal pad 152 and the connection pad 222 are illustrated as being offset in the vertical direction for the descriptions of the signal pad 152 located under the connection pad 222. However, the construction of the signal pad 152 and the connection pad 222 is not limited as that illustrated in FIGS. 1 and 3.

For example, the signal pad 152 and the connection pad 222 may be entirely superimposed with each other in the planar direction. Additionally, the ground pad 154 and the bonding pad 224 are illustrated as being offset in the vertical direction for the descriptions of the ground pad 154 located under the bonding pad 224, but the construction of the ground pad 154 and the bonding pad 224 is not limited as that illustrated in FIGS. 1 and 3.

In example embodiments, an area of the bonding pad 224 may be smaller than an area of the ground pad 154. For example, the bonding pad 224 may have a smaller size than that of the ground pad 154. In this case, the ground pad 154 may include a margin area that may not overlap the bonding pad 224.

Accordingly, an impedance of the antenna structure may be easily adjusted to a range suitable for a specific frequency by the bonding pad 224. Thus, in transmitting and receiving signals in the multiple band, a gain of the antenna structure may be increased in a desired frequency band, and radiation properties may be improved.

Additionally, an impedance matching may be implemented using only the circuit board without modifying the design of the antenna unit 110. Thus, the area of the bonding pad 224 included in the circuit board may be controlled without changing the shape/design of the antenna unit 110, so that degree of freedom in the design and the process may be increased.

In some embodiments, the area of the bonding pad 224 may be greater than 50% and less than 100% of the area of the ground pad 154, preferably in a range from 50% and 80%, and more preferably from 60% and 80%.

If the area of the bonding pad 224 is less than 50%, the impedance matching/balancing may not be easily implemented and signal loss may occur. Additionally, a bonding area between the antenna unit and the circuit board may be reduced to lower bonding stability.

In an embodiment, a width d1 of the bonding pad 224 may be smaller than a width d2 of the ground pad 154. For example, a ratio of the width d1 of the bonding pad 224 to a width d2 of the ground pad 154 may be 0.5 or more and less than 1, preferably in a range from 0.5 to 0.8.

For example, the width of the ground pad 154 may be adjusted to about 5 mm or less, and the width of the bonding pad 224 may be adjusted to about 3.8 mm or less.

In an embodiment, a length of the bonding pad 224 and a length of the ground pad 154 may be substantially the same. Accordingly, the bonding area of the bonding pad 224 and the ground pad 154 in a length direction may be increased, and bonding stability between the antenna unit 110 and the circuit board 200 may be improved.

In an embodiment, an area of the signal pad 152 and an area of the connection pad 222 may be substantially the same. For example, a width d3 of the signal pad 152 and a width of the connection pad 222 may be substantially the same.

In the case where the area of the connection pad 222 is different from the area of the signal pad 152, an impedance set in the antenna unit 110 may be disturbed, and efficiency of the signal transmission and reception of the antenna structure may be degraded.

In an embodiment, a length of the signal pad 152 and a length of the connection pad 222 may be substantially the same.

In some embodiments, a ratio of the width d3 of the signal pad 152 and the width d2 of the ground pad 154 may be properly adjusted based on target driving frequency band and impedance.

For example, the width d3 of the signal pad 152 and the width d2 of the ground pad 154 may be substantially the same. For example, the width d3 of the signal pad 152 may be smaller than the width d2 of the ground pad 154. For example, the width d3 of the signal pad 152 may be larger than the width d2 of the ground pad 154.

Figure 4:
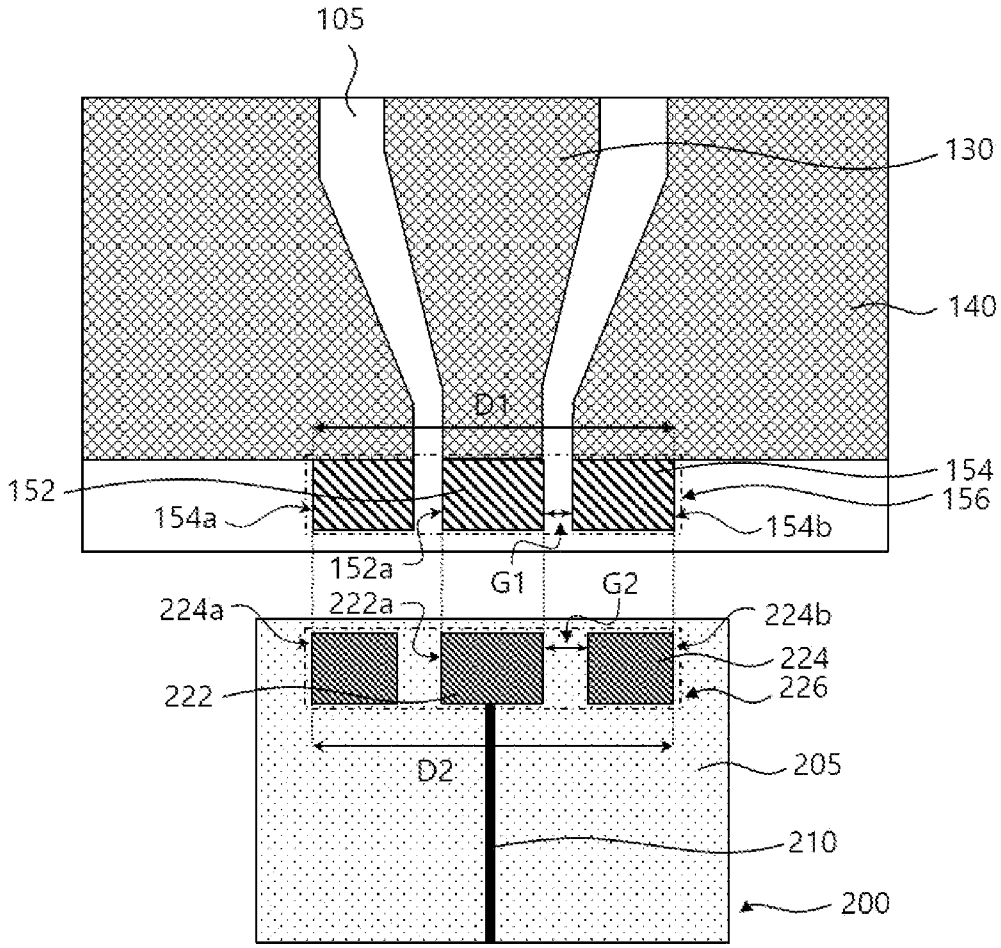
FIG. 4 is a schematic plan view illustrating a state before the antenna unit of FIG. 1 and a circuit board are bonded to each other.

FIG. 4 is a schematic plan view illustrating a state before the antenna unit 100 and the circuit board 200 are bonded to each other for describing a connection portion of the antenna unit 110 and the circuit board.

Referring to FIG. 4, a first connection portion 156 may be defined by the signal pad 152 and a pair of the ground pads 154, and a second connection portion 226 may be defined by the connection pad 222 and a pair of the bonding pads 224.

In some embodiments, a width D1 of the first connection portion 156 and a width D2 of the second connection portion 226 may be substantially the same. For example, a distance between a left side of a left one of the ground pads 154 and a right side of a right one of the ground pads 154, and a distance between a left side of a left one of the bonding pads 224 and a right side of a right one of the bonding pads 224 may be substantially the same.

One side of the ground pad 154 and one side of the bonding pad 224 may substantially overlap each other.

For example, a left side 154*a* of the ground pad 154 located at a left region from the signal pad 152 and a left side 224*a* of the bonding pad 224 located at a left region of the connection pad 222 may coincide with each other in the plan view.

For example, a right side 154*b* of the ground pad 154 located at a left region from the signal pad 152 and a right side 224*b* of the bonding pad 224 located at a right region from the connection pad 222 may coincide with each other in the plan view.

Accordingly, the first connection portion 156 and the second connection portion 226 may be allocated at substantially the same region in the plan view. Thus, noise and signal quality deterioration due to misalignment of the first connection portion 156 and the second connection portion 226 may be prevented, and impedance adjustment/balancing by the second connection portion 226 may be easily performed.

In some embodiments, both lateral sides 152*a* of the signal pad 152 and both lateral sides 222*a* of the connection pad 222 may substantially coincide with each other in the plan view. For example, the signal pad 152 and the contact pad 222 may be substantially entirely superimposed with each other in the plan view. Accordingly, the connection pad 222 may cover, e.g., 90% or more, 97% or more, 99% or more, 100% of an area of the signal pad 152 in the plan view. Thus, efficiency of signal transmission and reception between the antenna unit 110 and the external circuit may be improved, and increase of resistance and noise may be suppressed.

For example, during the multi-band communication, a resistance or an impedance for a resonance without a signal reflection may be set to a predetermined value through the driving IC chip.

In example embodiments, a gap G1 between the signal pad 152 and the ground pad 154 may be smaller than a gap G2 between the connection pad 222 and the bonding pad 224. The gap G2 between the connection pad 222 and the bonding pad 224 may be adjusted, so that the set value of the impedance may be maintained while suppressing or buffering an impedance mismatch that may occur in the bonding region.

In some embodiments, the connection pad 222 and the bonding pad 224 may be disposed on a bottom surface of the core layer 205 together with the circuit wiring 210. For example, the connection pad 222 and the bonding pad 224 may be disposed at the same level or at the same layer as that of the circuit wiring 210.

Figure 5:
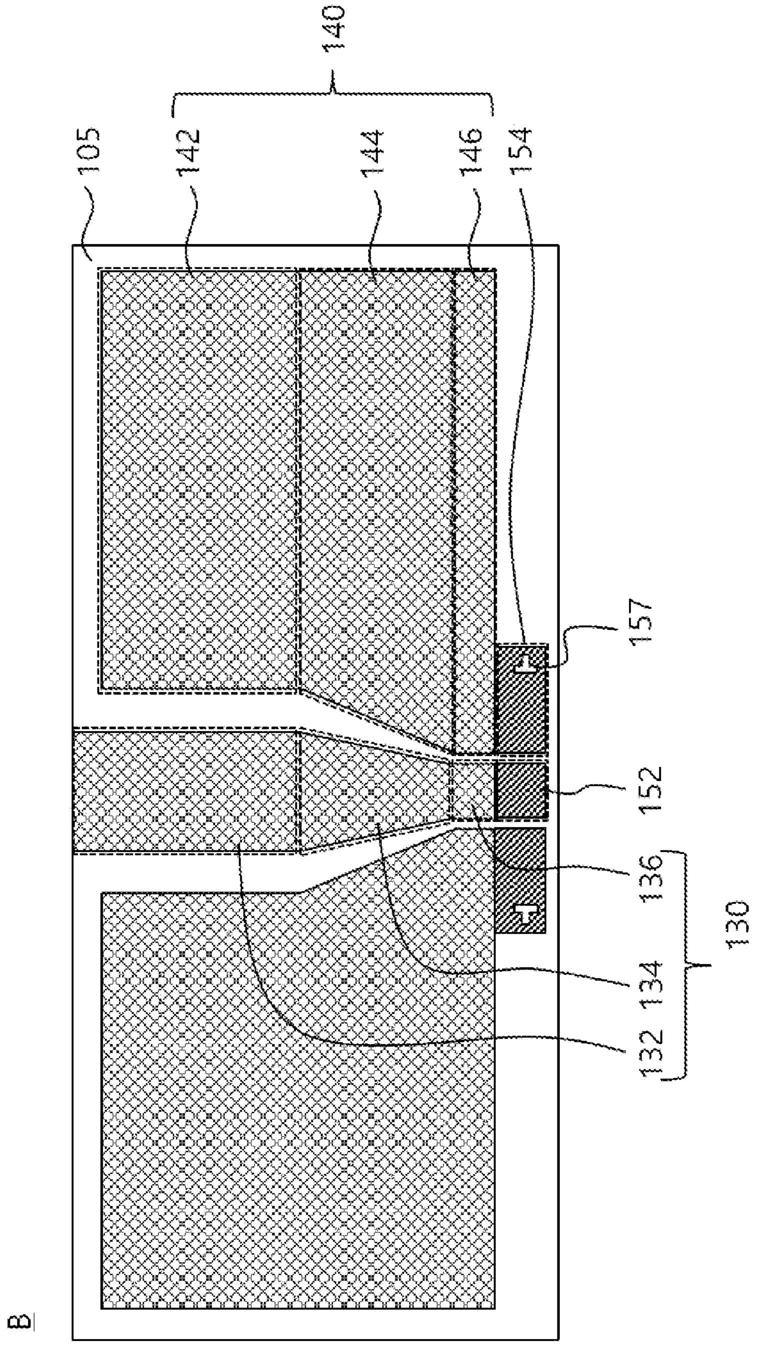
FIG. 5 is an enlarged plan view of a region B of FIG. 1.

In an embodiment, the connection pad 222 and the bonding pad 224 may have a solid structure to increase transfer efficiency of electromagnetic wave and power to the antenna unit 110 and noise absorption efficiency FIG. 5 is an enlarged plan view of a region B of FIG. 1. For convenience of descriptions, the circuit board 200 is omitted in FIG. 5.

Referring to FIG. 5, the ground pattern 140 may include a first portion 142, a second portion 144 and a third portion 146 that may be integral with each other.

In some embodiments, the first portion 142 may extend to have a constant width.

The third portion 146 may be spaced apart from the first portion 142 and may have a width greater than that of the first portion 142.

The second portion 144 may be disposed between the first portion 142 and the third portion 146, and a width of the second portion 144 may increases in a direction from the first portion 142 to the third portion 146. Accordingly, a gap between the ground pattern 140 and the transmission line 130 may be gradually decreased. Accordingly, signal loss during a transmission from the signal pad 152 to the radiator 120 may be suppressed.

For example, a distance between a side of the second portion 144 adjacent to the transmission line 130 and the transmission line 130 may be decreased in a direction from the first portion 142 to the third portion 146.

For example, the first portion 142 may extend from the second portion 144 toward the radiator 120 in an extending direction of the transmission line 130 extends. In an embodiment, the first portion 142 may have a rectangular shape.

For example, the third portion 146 may extend from the second portion 144 in a direction opposite to the extending direction of the first portion 142. In an embodiment, the third portion 146 may have a rectangular shape.

In an embodiment, an area of the third portion 146 may be larger than an area of the first portion 142. Accordingly, noises in the signal pad 152 connected to an external circuit and a connector 136 connected to the signal pad 152 may be suppressed, and an antenna gain may be enhanced.

The first portion 142, the second portion 144 and the third portion 146 may serve as a fourth radiator by, e.g., an electrical coupling with the radiator 120 and/or the transmission line 130.

In an embodiment, the ground pad 154 may be integral with the ground pattern 140. For example, the first portion 142, the second portion 144, the third portion 146 and the ground pad 154 may be formed integrally using the same material. For example, the ground pad 154 may protrude from the third portion 146.

For example, the ground pad 154 may include an alignment mark 157. Accordingly, reliability, precision and efficiency in the fabrication process may be improved.

In some embodiments, the transmission line 130 may include an extension portion 132 directly connected to the third radiation portion at one end thereof. For example, the extension portion 132 may have a constant width.

In some embodiments, the transmission line 130 may include a portion, a width of which becomes smaller in a direction from the radiator 120 to the signal pad 152.

For example, the transmission line 130 may include an inclined portion 134 between the extension portion 132 and the signal pad 152. A width of the inclined portion 134 may become smaller in the direction from the radiator 120 to the signal pad 152.

Accordingly, the width of the transmission line 130 may be increased in a direction from the signal pad 152 to the radiator 120, so that an impedance matching may be implemented in a wide bandwidth ma. Accordingly, a multi-band resonance may be stably formed in the radiator 120.

In some embodiments, the transmission line 130 may further include the connector 136 between the inclined portion 134 and the signal pad 152, and the connector 136 may have a constant width. Accordingly, the circuit board may be bonded/coupled to the signal pad 152 with high reliability, and the desired impedance matching and the antenna gain may be stably obtained.

In an embodiment, a length of the inclined portion 134 of the transmission line 130 and a length of the second portion 144 in the ground pattern 140 in the extending direction of the transmission line 130 may be substantially the same. Accordingly, the impedance matching and noise control may be more efficiently performed.

In an embodiment, the connector 136 and the signal pad 152 may have substantially the same width.

In some embodiments, the ground pattern 140 and the transmission line 130 may include a mesh structure. Accordingly, the antenna structure may be prevented from being visible to a user.

Figure 6:
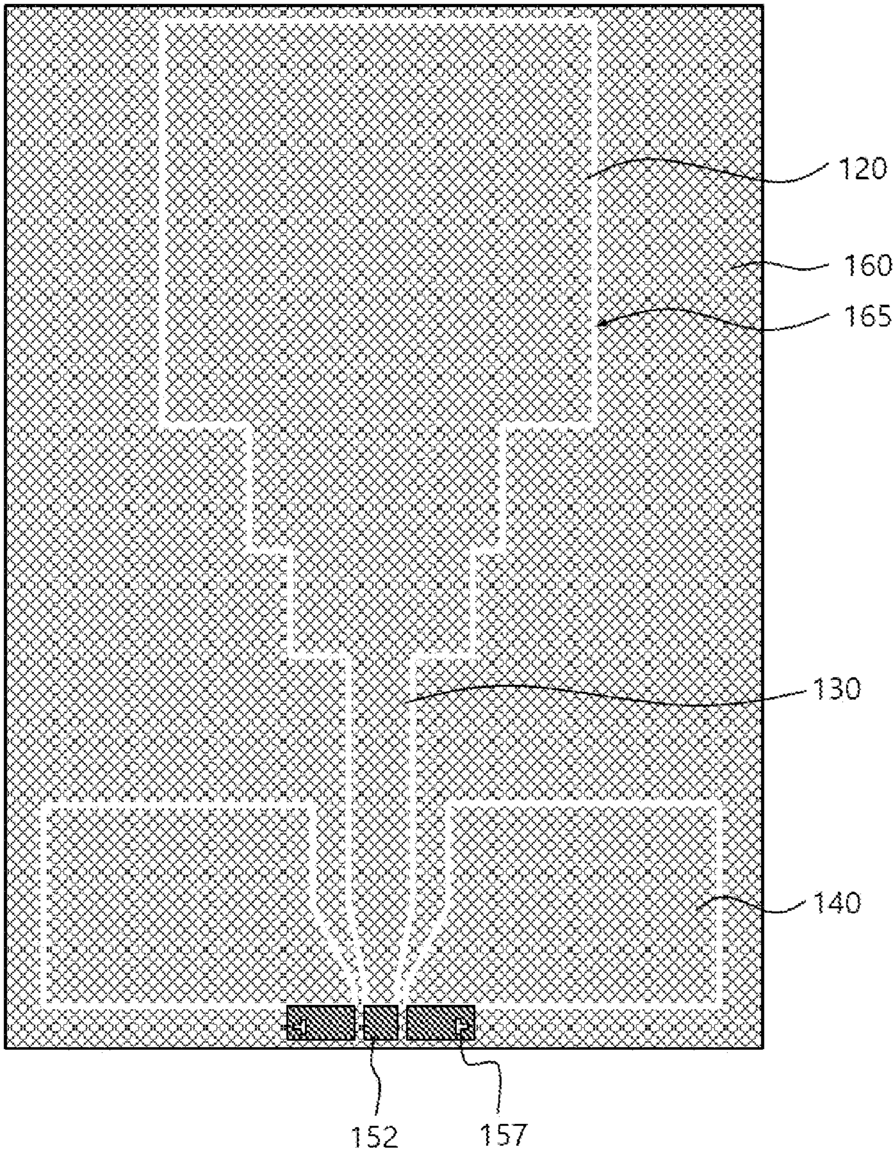
FIG. 6 is a schematic plan view illustrating an antenna structure in accordance with exemplary embodiments.

FIG. 6 is a schematic plan view illustrating an antenna structure in accordance with exemplary embodiments. For convenience of descriptions, the circuit board 200 is omitted in FIG. 6.

Referring to FIG. 6, the antenna structure may further include a dummy mesh pattern 160 disposed around the antenna unit 110. For example, the dummy mesh pattern 160 may be electrically and physically separated from the antenna unit 110 by a separation region 165.

For example, a conductive layer containing the above-described metal or alloy may be formed on the dielectric layer 105. A mesh structure may be formed by etching the conductive layer while also etching the conductive layer along a boundary of the antenna unit 110. Accordingly, the antenna unit 110 and the dummy mesh pattern 160 spaced apart from each other by the separation region 165 may be formed.

In some embodiments, the antenna unit 110 may also share the mesh structure. Accordingly, a transmittance of the antenna unit 110 may be improved, and the dummy mesh pattern 160 may be distributed so that optical characteristics around the antenna unit 110 may become uniform. Thus, the antenna unit 110 may be prevented from being visually recognized.

In an embodiment, the antenna structure may be applied to various objects, which will be described later. If the ground pattern 140 is located in an area of the object that is not visible to the user, the ground pattern 140 may have a solid structure.

For example, if the antenna unit 110 is located in an area that is not visible to the user of the object to which the antenna structure is applied, the antenna unit 110 may include a solid structure.

The dummy mesh pattern 160 may include conductive lines that intersect each other to form the mesh structure therein. In some embodiments, the dummy mesh pattern 160 may include segmented regions where the conductive lines are cut. Accordingly, the radiation properties of the antenna unit 110 may be prevented from being disturbed by the dummy mesh pattern 160.

Figure 7:
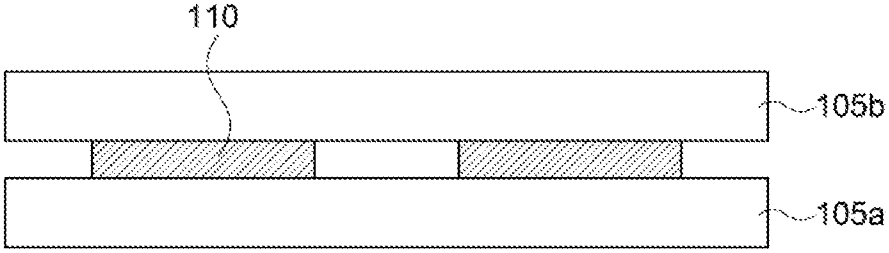
FIG. 7 is a schematic cross-sectional view illustrating an antenna structure in accordance with exemplary embodiments.

FIG. 7 is a schematic cross-sectional view illustrating an antenna structure in accordance with exemplary embodiments.

Referring to FIG. 7, the antenna unit 110 may be disposed between a first dielectric layer **105*a* and a second dielectric layer 105*b*. For example, the antenna unit 110 may be sandwiched or embedded between the first and second dielectric layers 105*a* and 105*b***.

In an embodiment, the second dielectric layer **105*b* may expose the signal pad 152 and the ground pad 154 of the antenna unit 110 to an outside. For example, the second dielectric layer 105*b* may be formed on a remaining portion of the antenna unit 110 except for the signal pad 152 and the ground pad 154**.

The first and second dielectric layers **105*a* and 105*b* may be disposed on a top surface and a bottom surface of the antenna unit 110, so that dielectric and radiation environment around the antenna unit 110** may become uniform.

In some embodiments, the second dielectric layer **105*b* may be provided as a coating layer, an insulating layer and/or a protective film of the antenna unit 110** or the antenna structure.

In some embodiments, the antenna structure may include two or more antenna units 110. For example, a plurality of the antenna units 110 may be arranged to form an array. For example, the plurality of antenna units 110 may be arranged without forming an array. Accordingly, an overall gain of the antenna structure may be increased, and the multi-band radiation may be sufficiently provided.

The above-described antenna structure may be applied to various structures and objects such as a window of public transportation such as a bus and a subway, a building, a vehicle, a decorative sculpture, a guidance sign (e.g., a direction sign, an emergency exit sign, an emergency light, etc.), and may serve as, e.g., a relay antenna structure. The relay antenna structure may include, e.g., an access point (AP) such as a repeater, a router, a small cell, an internet router, etc.

Figure 8:
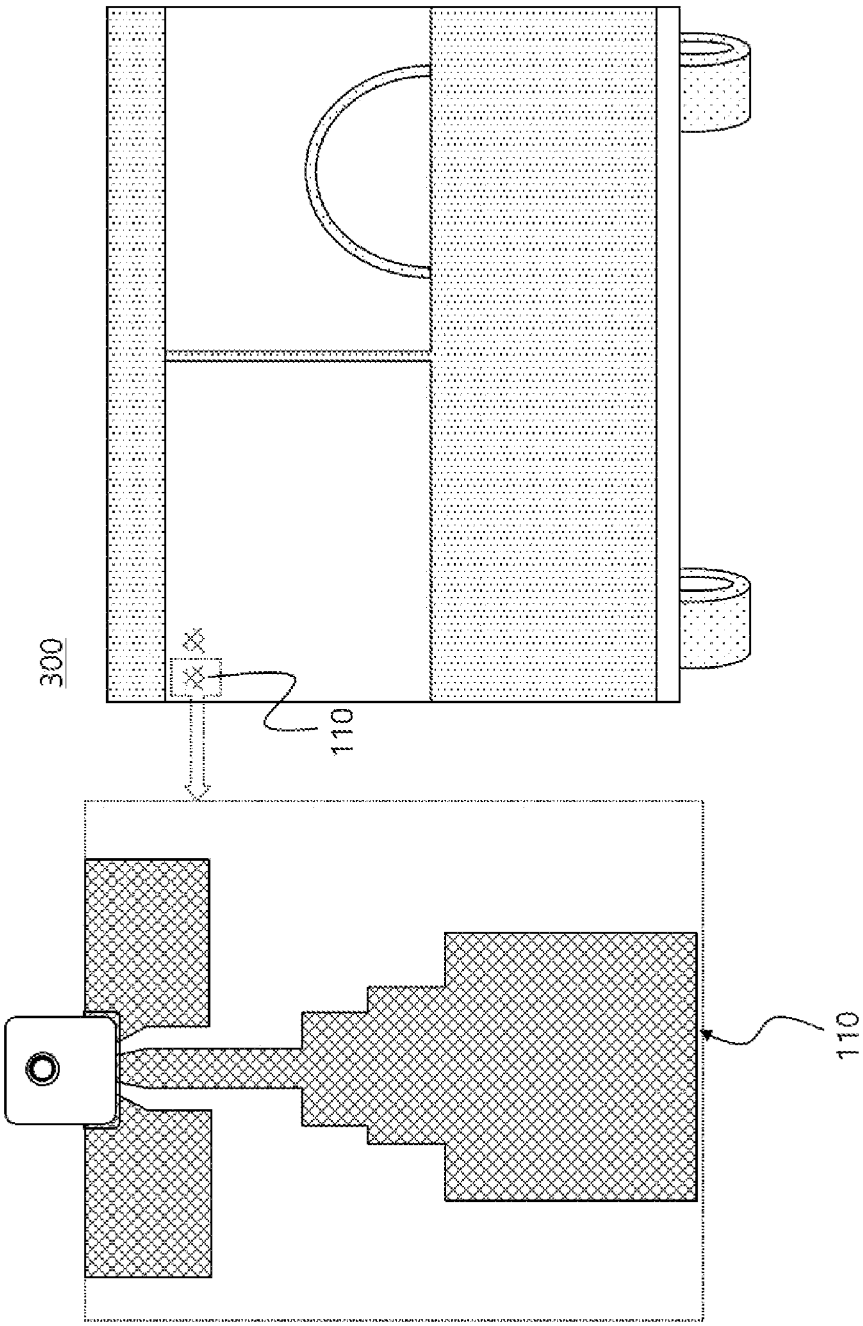
FIG. 8 is a schematic view illustrating an antenna structure in accordance with exemplary embodiments.

FIG. 8 is a schematic view illustrating an antenna structure in accordance with exemplary embodiments.

For example, FIG. 8 is a schematic view illustrating a router structure in which the antenna structure is attached to an object 300 (e.g., public transportation such as a bus or a subway).

Referring to FIG. 8, the antenna structure may have a construction that may be fixed to a window of public transportation, a wall or a ceiling of a building structure, a window, a vehicle, a sign, etc. For example, the above-described antenna unit 110 may be inserted into or attached to a substrate.

For example, the substrate may serve as the dielectric layer 105 as illustrated in FIG. 1. As illustrated in FIG. 7, the first dielectric layer 105*a* and the second dielectric layer 105*b* may commonly serve as the substrate, and the antenna unit 110 and 300 may be buried in the substrate. The substrate may serve as public transport windows, a building, various decorative structures, an instruction sign, a window, etc.

In some embodiments, the above-described antenna structure may be attached to the substrate in the form of a film.

As described above, the dummy mesh pattern 160 may be formed around the antenna unit 110 to reduce or prevent a visual recognition of the antenna unit. At least a portion of the antenna unit 110 may also have a mesh structure.

The antenna unit 110 may be connected to an external circuit board through the first connection portion 156. For example, the external circuit board may be a PCB (Printed Circuit Board) including a rigid board or an FPCB.

In an embodiment, an antenna cable may be electrically connected to a conductive bonding structure such as an anisotropic conductive film (ACF), to supply a power to the signal pad 152 of the antenna unit 110.

For example, the antenna cable may be buried in the object 300 such as public transportation such as a bus, a subway, etc., an inner wall of a building, a window, a sign board, etc., and may be coupled with an external power supply, an integrated circuit chip or an integrated circuit board. Accordingly, the power may be supplied to the antenna unit 110 and antenna radiation may be performed.

As illustrated in FIG. 8, the above-described antenna unit 110 may be attached to the object 300 (e.g., a window of public transportation such as a bus or subway) and may be electrically connected to, e.g., a Wi-Fi repeater in public transportation through the antenna cable. Accordingly, a multi-band wireless communication network may be implemented within public transportation.

Experimental Example: Measurement of Signal Loss Level (S21)

Antenna properties of the antenna structures of Example 1, Example 2 and Comparative Example 1 manufactured according to the structures illustrated in FIGS. 1 and 2 were evaluated.

The radiator 120, transmission line 130 and ground pattern 140 were formed in a mesh structure using a Cu—Ca alloy, and the ground pad 154 and signal pad 152 were formed as a solid pattern structure contain the Cu—Ca alloy. A width of the signal pad 152 and the ground pad 154 was each 5 mm.

The connection pad 222, the bonding pad 224, the circuit wiring 210 and the ground layer 230 included in the circuit board 200 were formed of a copper layer. A size of the connection pad 222 was the same as the size of the signal pad 152.

In Example 1, an area of the bonding pad 224 was 50% of an area of the ground pad 154, and a width of the bonding pad 224 was 2.5 mm. In Example 2, the area of the bonding pad 224 was 76% of the area of the ground pad 154, and the width of the bonding pad 224 was 3.8 mm.

In Comparative Example 1, the width of the bonding pad 224 was be 5 mm, and the area of the bonding pad 224 was the same as the area of the ground pad 154.

An antenna gain for the antenna structure was measured. Specifically, the antenna gain was measured by extracting S-parameters according to frequencies using a network analyzer. The measurement results are shown in FIG. 9.

Figure 9:
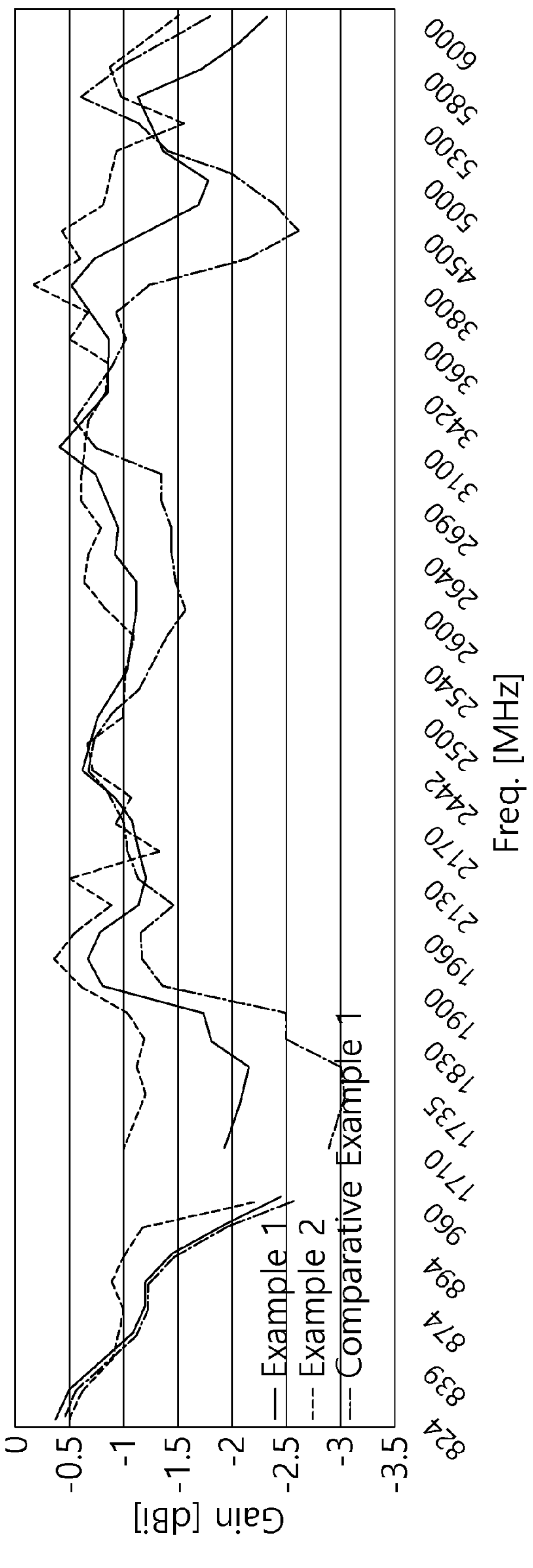
FIG. 9 is a graph showing antenna gains according to frequencies of antenna structures according to Example and Comparative Example.

Referring to FIG. 9, the antenna structure of Comparative Example 1 where the area of the bonding pad 224 was the same as the area of the ground pad 154 provided low antenna gains in all frequency bands.

The antenna structures of Examples 1 and 2 where the area of the bonding pad 224 was smaller than the area of the ground pad 154 provided relatively high antenna gains.

What is claimed is:

1. An antenna structure comprising:
an antenna unit comprising:
a radiator including a plurality of radiation portions, widths of which sequentially decrease:
a transmission line extending between the radiator and the signal pad;
a pair of a ground pattern disposed around the transmission line to be physically spaced apart from the radiator and the transmission line:
a signal pad; and
a ground pad spaced apart from the signal pad, and
a circuit board electrically connected to the antenna unit, the circuit board comprising a connection pad connected to the signal pad and a bonding pad connected to the ground pad, the bonding pad having an area smaller than an area of the ground pad.

2. The antenna structure of claim 1, wherein the area of the bonding pad is 50% or more, and less than 100% of the area of the ground pad.

3. The antenna structure of claim 1, wherein a length of the bonding pad and a length of the ground pad are the same, and a width of the bonding pad is smaller than a width of the ground pad.

4. The antenna structure of claim 1, wherein an area of the signal pad and an area of the connection pad are the same.

5. The antenna structure of claim 1, wherein a gap between the signal pad and the ground pad is smaller than a gap between the connection pad and the bonding pad.

6. The antenna structure of claim 1, wherein a pair of the ground pads are disposed to face each other with the signal pad interposed therebetween, and a pair of the bonding pads are disposed to face each other with the connection pad interposed therebetween.

7. The antenna structure of claim 6, wherein a left side of the ground pad adjacent to a left side of the signal pad and a left side of the bonding pad adjacent to a left side of the connection pad overlap each other in a plan view, and
a right side of the ground pad adjacent to a right side of the signal pad and a right side of the bonding pad adjacent to a right side of the connection pad overlap each other in the plan view.

8. The antenna structure of claim 1, wherein the ground pad protrudes from a bottom side of the ground pattern.

9. The antenna structure of claim 1, wherein the plurality of radiation portions comprise a first radiation portion, a second radiation portion and a third radiation portion, widths of which sequentially decrease.

10. The antenna structure of claim 9, wherein the first radiation portion, the second radiation portion and the third radiation portion are arranged in a stepped shape.

11. The antenna structure of claim 9, wherein an average resonance frequency of the second radiation portion is greater than an average resonance frequency of the first radiation portion, and an average resonance frequency of the third radiation portion is greater than the average resonance frequency of the second radiation portion.

12. The antenna structure of claim 9, wherein the ground pattern serves as a fourth radiation portion.

13. The antenna structure of claim 12, wherein an average resonance frequency of the fourth radiation portion is greater than an average resonance frequency of the third radiation portion.

14. The antenna structure of claim 1, wherein the transmission line comprises:

an extension portion directly connected to the radiator at one end of the transmission line; and an inclined portion disposed between the extension portion and the signal pad, the inclined portion having a width that becomes smaller in a direction from the extension portion to the signal pad.

15. The antenna structure of claim 14, wherein the transmission line further comprises a connector being disposed between the inclined portion and the signal pad and having a constant width.

16. The antenna structure of claim 1, wherein the ground pattern comprises:

a first portion having a constant width;

a third portion that is spaced apart from the first portion and has a larger constant width than that of the first portion; and a second portion between the first portion and the third portion, the second portion having a width that increases in a direction from the first portion to the third portion.

17. The antenna structure of claim 16, wherein a distance between the second portion and the transmission line decreases in a direction from the first portion to the third portion.

18. The antenna structure of claim 1, wherein the radiator has a mesh structure.

19. The antenna structure of claim 18, further comprising a dummy mesh pattern disposed around the radiator and spaced apart from the radiator.

20. An antenna structure, comprising:

a dielectric layer;

an antenna unit on a top surface of the dielectric layer, the antenna unit comprising:

a radiator; and a signal pad connected to the radiator and a ground pad spaced apart from the signal pad, wherein the radiator, the signal pad and the ground pad are disposed at the same level on the top surface of the dielectric layer; and an anisotropic conductive film attached on the signal pad and the ground pad, a circuit board electrically connected to the antenna unit via the anisotropic conductive film over the top surface of the dielectric layer, the circuit board comprising a connection pad connected to the signal pad and a bonding pad connected to the ground pad, the bonding pad having an area smaller than an area of the ground pad.

* * * * *